United States Patent
Komatsu et al.

[11] Patent Number: 5,975,232
[45] Date of Patent: Nov. 2, 1999

[54] POWER ASSISTED STEERING APPARATUS FOR AUTOMOTIVE VEHICLE

[75] Inventors: Koichi Komatsu; Tatsuyoshi Maruyama, both of Atsugi; Tadaharu Yokota, Samukawa; Toshinori Aihara, Hadano; Norihiro Saita, Isehara, all of Japan

[73] Assignee: Unisia Jecs Corporation, Atsugi, Japan

[21] Appl. No.: 08/779,906

[22] Filed: Jan. 7, 1997

[30] Foreign Application Priority Data

Jan. 18, 1996 [JP] Japan .................................. 8-023467
Jan. 18, 1996 [JP] Japan .................................. 8-023469

[51] Int. Cl.$^6$ ........................................ B62D 5/00
[52] U.S. Cl. ................... 180/417; 180/441; 180/442; 417/302; 417/308; 417/310
[58] Field of Search .................... 180/417, 400, 180/414, 421, 441, 442, 406, 418; 417/310, 308, 302, 304, 296, 504; 137/115

[56] References Cited

U.S. PATENT DOCUMENTS

| | | | |
|---|---|---|---|
| 3,719,249 | 3/1973 | Becker et al. | 180/406 |
| 4,076,096 | 2/1978 | Hushower et al. | 180/418 |
| 4,243,115 | 1/1981 | Wall et al. | 180/165 |
| 4,597,718 | 7/1986 | Nakano et al. | 417/304 |
| 4,838,767 | 6/1989 | Ohe et al. | 417/304 |
| 5,017,098 | 5/1991 | Hansen et al. | 417/302 |
| 5,271,475 | 12/1993 | Takeshita | 180/79.1 |
| 5,289,681 | 3/1994 | Iwata | 137/115 |

FOREIGN PATENT DOCUMENTS

| | | | |
|---|---|---|---|
| 56-148693 | 11/1981 | Japan | 417/310 |
| 61-85272 | 4/1986 | Japan . | |
| 63-1781 | 6/1988 | Japan | 418/171 |
| 4-321803 | 11/1992 | Japan . | |
| 2 004 513 | 4/1979 | United Kingdom . | |
| 1 591 206 | 6/1981 | United Kingdom . | |

*Primary Examiner*—Robert J. Oberleitner
*Assistant Examiner*—Pamela J. Lipka
*Attorney, Agent, or Firm*—Foley & Lardner

[57] ABSTRACT

A power assisted steering apparatus for a vehicle has a driving source and an actuator for the vehicle's steering mechanism, to power assist the steering operation. The driving source, such as an engine, continuously drives a pump. A working passage is arranged so that working oil discharged from the pump is introduced into the actuator. A check valve is disposed in the working passage, between the actuator and the pump so that the working oil flows only one way to the actuator. An accumulator is connected to the working passage, between the check valve and the actuator to maintain a predetermined pressure in the working passage. A regulator is connected to the working passage, between the pump and the check valve to regulate flow to the actuator. When the pressure within the working passage reaches the predetermined pressure, the working fluid is dumped to a reservoir, bypassing the check valve, the accumulator, and the actuator.

6 Claims, 2 Drawing Sheets

POWER ASSISTED STEERING APPARATUS FOR AUTOMOTIVE VEHICLE

BACKGROUND OF THE INVENTION

The present invention relates to a power assisted steering apparatus which is applicable to an automotive vehicular steering system.

Generally, in order to facilitate a steering operation through a steering wheel with less force, various types of power assisted steering apparatuses in which supply and exhaust of a working oil (hydraulic) into or from a (hydraulic) actuator installed in the vehicular steering system are carried out to achieve a steering assisted power have been used.

A Japanese Patent Application First Publication No. Showa 61-85272 exemplifies one of the previously proposed power assisted steering apparatuses which is provided with an actuator constituted by a regulating valve and a power cylinder, a hydraulic circuit interposed between an oil pump driven by means of an electric motor and the actuator, an accumulator installed in the hydraulic circuit, a pressure sensor arranged for detecting a hydraulic pressure in the hydraulic circuit, a controller arranged for receiving a detection signal from the pressure sensor and controlling a drive or stop of the motor according to the received detection signal.

In the disclosed vehicular power assisted steering apparatus, when the pressure sensor detects a reduction in the hydraulic pressure in the hydraulic circuit, the working oil is accumulated into the accumulator so that, during an abrupt steering operation, an inconvenience for a discharge oil quantity to become insufficient can be eliminated because of its rise characteristic of the hydraulic pump in a start operation.

However, since the pump for the hydraulic pressure generation is driven and rotated by means of the motor, a driving energy of an engine mounted in the vehicle is not only reduced according to a working efficiency of the motor but also is reduced according to a power generation efficiency of an alternator of the engine so that an energy loss becomes large. In addition, since the motor is controlled according to the detection signal from the pressure sensor for electrically detecting the hydraulic pressure in the hydraulic circuit, the pressure sensor and the controller are required so that a whole power assisted steering apparatus becomes expensive.

A Japanese Patent Application First Publication No. Heisei 4-321803 exemplifies another previously proposed power assisted steering apparatus which is provided with a variable capacity pump, a spring biased in a direction such that the discharge quantity of the variable capacity pump is decreased, a regulator biased in a direction such that the discharge quantity of the variable capacity pump is increased, a hydraulic circuit arranged for introducing the discharge oil of the variable capacity pump into the actuator via a cargo control valve, an accumulator arranged for holding the remaining pressure of the hydraulic circuit up to a predetermined value, an open/closure valve disposed within a pressure introducing passage linked between the hydraulic circuit and regulator, and a cargo switch operatively opening or closing the open/closure valve.

When the actuator is not operated, the open/closure valve is closed to zero the discharge quantity of the working oil from the variable capacity pump and the remaining pressure of the hydraulic circuit is introduced into the regulator which is held up to the predetermined value by means of the accumulator, thus increasing the discharge quantity of the variable capacity pump.

Since, in the latter previously proposed power assisted steering apparatus, the variable capacity pump is always operated and during non-operation of the actuator the discharge quantity of the variable capacity pump is zeroed so as to avoid an energy loss, it is not necessary to install a clutch mechanism so as to halt the drive to the pump during the non-operation of the actuator, in order to avoid the energy loss and the whole apparatus becomes simplified.

In addition, since, in the latter previously proposed power assisted steering apparatus, during the abrupt steering operation, both of the open/closure valve and the cargo control valve are opened so that the remaining pressure in the hydraulic circuit which is held to the predetermined value by means of the accumulator is speedily supplied to the regulator and actuator, thereby the discharge quantity of the variable capacity valve being increased and the power assisted steering operation being achieved.

However, in the latter previously proposed power assisted steering apparatus, the discharge quantity of the variable capacity pump is zeroed during the non-operation of the actuator. If the discharge quantity of the variable capacity valve is zeroed, the working oil is left in an inside of the pump and a suspended state of the working oil is continued. In this state, in addition to a heat generation of a constituent part of the pump due to a frictional slide thereof, a temperature of the working oil is increased so that an earlier deterioration of the working oil may be resulted. A reduced durability in the power assisted steering apparatus is involved.

SUMMARY OF THE INVENTION

It is an object of the present invention to provide a power assisted steering apparatus for an automotive vehicle which achieves a circulation of a working oil into a drain passage so as to suppress a temperature rise in the working oil and achieve a superior durability in the apparatus.

According to one aspect of the present invention, there is provided with a power assisted steering apparatus for a vehicle having a driving source, comprising:

a) an actuator installed in a steering mechanism of the vehicle so as to receive a supply or exhaust of a working oil to derive a power assisting steering operation derived through a steering wheel;

b) a pump so arranged as to always be driven to rotate according to a driving force from the driving source;

c) a working oil pressure passage so arranged as to introduce the working oil discharged from said pump into said actuator;

d) a check valve disposed in a midway through said working oil pressure passage so as to allow the working oil to be caused to flow from said pump to the actuator but to block the working oil from being caused to flow in a direction opposite to the pump from said actuator;

e) an accumulator connected to a part of said working oil pressure passage which is upstream with respect to the check valve for enabling a pressure within said working oil pressure passage to be held under a predetermined pressure value;

f) a regulator arranged at an upstream position with respect to the check valve for regulating an inflow quantity of the working oil discharged into the working oil pressure passage into a drain passage when the pressure within the working oil pressure passage reaches the predetermined pressure value; and g) a regulated working oil pressure passage arranged so as to introduce the working oil pressure at a part of the working oil pressure passage which is downstream with respect to said check valve into said regulator.

BEST MODE FOR CARRYING OUT THE INVENTION

Reference will hereinafter be made to the drawings in order to facilitate a better understanding of the present invention.

First Embodiment

Figure 1:
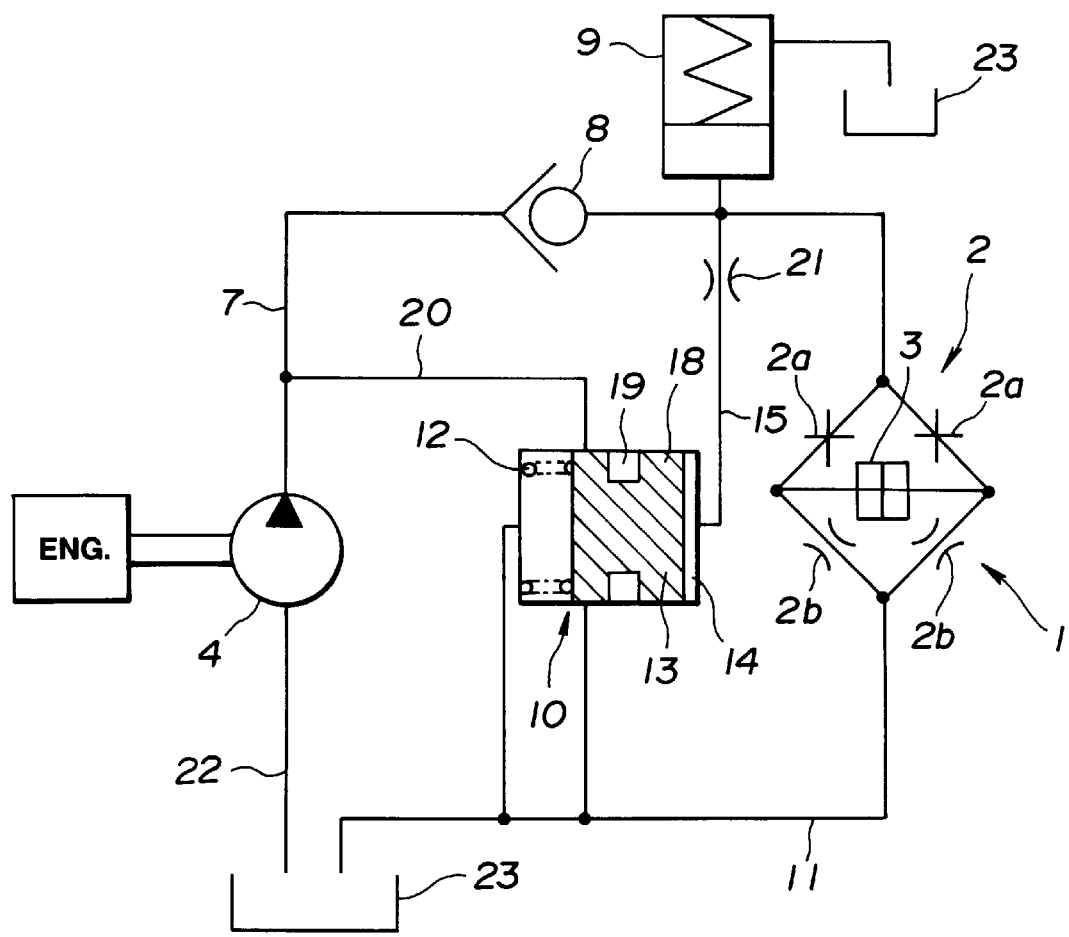
FIG. 1 is a schematic hydraulic circuit diagram of a power assisted steering apparatus in a first preferred embodiment according to the present invention.

FIG. 1 shows a first preferred embodiment of a power assisted steering apparatus according to the present invention.

An actuator 1 of the power assisted steering apparatus includes: a regulating valve 2 of a center close type and a power cylinder 3.

The regulating valve 2 includes normally closed valves 2a installed in an internal of a working oil pressure passage (hydraulic circuit) and normally opened valves 2b installed in an internal of a drain passage as will be described later.

A fixed capacity pump 4 can always be driven by means of an internal combustion engine as a driving source.

The working hydraulic pressure passage 7 serves to introduce the working oil discharged from the fixed capacity pump 4 into the actuator 1. A check valve 8 which serves to allow a circulation of a working oil from the fixed capacity pump to the actuator 1 and blocks a reverse flow thereof.

An accumulator 9 connected to a part of the working oil passage 7 which is downstream with respect to the check valve 8, the accumulator 9 being enabled to hold the pressure within the working oil pressure passage 7 at a predetermined value of pressure.

The regulator 10 serves to regulate an inflow quantity (circulation quantity) of the working oil drained in the drain passage 11 and discharged at the hydraulic passage 7 which is upstream with respect to the check valve 8.

The regulator 10 includes a regulating piston 13, to one end of which a regulating spring 12 is attached and on the other end of which a regulating oil chamber 14 is formed.

The working oil within a part of the hydraulic passage 7 which is downstream with respect to the check valve 8 is introduced into the regulating oil chamber 14 of the regulating valve via the regulating hydraulic passage 15. Thus, the regulating piston 13 of the regulator 10 is movable according to the spring force applied to the regulating spring force and according to the pressure of the working oil introduced into the regulating oil chamber 14.

The regulating piston 13 of the regulator 10 is formed with a groove 19 for dividing a land portion 18 into left and right sides at an approximately center portion in an axial direction thereof. Branch passage 20 and the drain passage 11 are opened and exposed to the groove 19. The branch passage 20 introduces the working oil within the hydraulic passage 7 which is upstream with respect to the check valve 8.

Furthermore, an orifice 21 is installed in a midway through the regulating hydraulic pressure passage 15. It is possible to attenuate a pressure variation of the working oil introduced into the regulator 10 via the controlled hydraulic passage 15. An intake hydraulic passage 22 is installed for sucking the working oil into the fixed capacity pump 4 and a reservoir tank 23 is installed.

In the first embodiment described above, the fixed capacity pump 4 is always rotated and driven by means of an internal combustion engine (driving source) 6.

The fixed capacity pump 4 sucks the working oil from the reservoir (oil tank) 23 via the intake hydraulic passage 22 and discharges the sucked working oil into the working hydraulic passage 7. The working oil discharged into the working oil pressure passage 7 is introduced into the actuator 1 via the check valve 8. The working oil introduced into the actuator 1 is consumed in order to exhibit a suitable steering assistance force during an operation of the actuator 1 requiring the steering assistance force. In details, the regulating valve 2 of the actuator 1 includes the normally closed valves 2a disposed at the upstream position of the working oil passage 7 and the normally opened valves 2b disposed at the downstream position of the drain passage 11. This regulating valve 2 is selectively controlled by means of a controller (not shown) so as to selectively drive the power cylinder 3, thus the actuator 1 being operated. Hence, the working oil introduced into the actuator 1 is consumed in order to exhibit suitably the steering assistance force.

When the working oil is discharged from the fixed capacity pump 4, the steering assistance force becomes unnecessary. When the actuator 1 is transferred from the operation state to the non-operation state, the working oil quantity consumed in the actuator 1 is progressively reduced and at last is zeroed. Much of the working oil discharged from the fixed capacity pump 4 is supplied to the accumulator 9 from the check valve 8 and a part of the working oil passage 7 which is downstream with respect to the check valve 8. Hence, the accumulator 9 accumulates the hydraulic oil. The accumulator 9 holds the pressure within the working oil pressure passage 7 located downstream of the check valve 8 during the non-operation of the actuator 1 at a predetermined pressure value.

It is noted that the predetermined pressure value held by means of the accumulator 9 can be determined according to the spring force of the regulating valve 12 attached onto the regulating piston 13 of the regulator 10.

The working oil within the part of the working oil passage 7 which is located at the downstream position with respect to the check valve 8 is introduced into the regulating oil chamber 14 of the regulator 10 via the regulating hydraulic pressure passage 15. According to an increase in the working oil pressure, a draining quantity of the working oil discharged from the fixed capacity pump 4 is increased by means of the regulator 10. In other words, the biasing force given to the regulator 10 is provided in proportion to the pressure of the working oil within the part of the working oil pressure passage 8 located at the downstream to the check valve 8. As the pressure of the working oil is increased, the drain flow quantity is increased so that the discharge quantity of the working oil into the actuator 1 from the fixed capacity pump 4 is progressively decreased. In details, the increase in the controlled hydraulic introduced into the regulating oil chamber 14 of the regulator 10 causes the regulating piston 13 to move against the spring force of the regulating spring 12 so that the branch passage 20 is communicated with the drain passage 11 via the groove 19 of the regulating piston 13. Consequently, the part or whole of the working oil discharged from the fixed capacity pump 4 is circulated from the working oil pressure passage 7 which is upstream with respect to the check valve 8 into the drain passage 11 via the branch passage 20.

When the working oil within the working oil pressure passage 7 is introduced into the regulator 10 via the regulating oil pressure passage 15, the orifice 21 disposed within the regulating oil pressure passage 15 serves to attenuate a pressure variation of the working oil.

When the pressure within the working oil pressure passage 7 introduced into the regulator 10 (,i.e., the regulating oil chamber 14) reaches a predetermined maximum pressure, the regulating piston 13 of the regulator 10 is moved to a leftmost position in FIG. 1 so that the branch passage 20 is communicated with the drain passage 11 at a maximum opening area via the groove 19 of the regulating piston 13.

Hence, the whole quantity of the working oil discharged into the working oil pressure passage 7 is circulated into the drain passage 11 at the upstream side with respect to the check valve 8. In other words, in this state, the working oil discharged from the fixed capacity pump 4 is immediately circulated into the drain passage 11 via the groove 19 of the regulating piston 13 from the branch passage 20 after the discharge without substantial receipt of a passage resistance at the upstream position with respect to the check valve 8.

Hence, without residence of the working oil into the fixed capacity pump 4, the working oil is circulated from the intake hydraulic passage 22 into the drain passage 11 so that a temperature rise in the working oil can advantageously be prevented. In addition, although the fixed capacity pump 4 is continuously driven and rotated by means of the engine (driving source) 6, the discharged working oil is circulated immediately into the drain passage 11. Thus, a work (energy) as a pump is slight so that a driving power that the fixed capacity pump 4 is less and the working loss can advantageously be avoided.

The whole quantity of the working oil discharged from the fixed capacity pump 4 is circulated from the branch passage 20 to the drain passage 11 via the regulator 10. In this state, although the working oil discharged from the fixed capacity pump 4 is not supplied within the part of the working hydraulic passage 7 which is upstream with respect to the check valve 8, the communication of part of the working oil pressure passage 7 which is downstream with respect to the check valve 8 is interrupted to the part thereof which is upstream with respect to the check valve 8 so that a pressure application force by means of the accumulator 9 is given to the working oil at the part of the passage 7 downstream to the check valve 8 which is held at the predetermined pressure value.

Hence, during the abrupt steering operation, the working oil located at the part of the working oil pressure passage 7 which is downstream to the check valve 8 and which is accumulated by the accumulator 9 is speedily supplied to the actuator 1 so that a smooth steering assistance operation can be achieved.

When the actuator 1 is operated so that the energy accumulated into the accumulator 9 is consumed and the pressure within the part of the working oil pressure passage 7 which is downstream to the check valve 8 is reduced, a pressure in the regulating oil chamber 14 of the regulator 10 into which the working oil within the working hydraulic pressure passage 7 is introduced is reduced. The regulator 10 gradually reduces the inflow quantity of the working oil discharged into the working oil pressure passage 7 into the drain passage 11 and, at last, is zeroed. In more details, when the pressure within the regulating oil chamber 14 of the regulator 13 is moved into the regulating oil chamber 14 by means of a spring force of the regulating spring 12 so that the communication between the branch passage 20 and the drain passage 11 via the groove 19 of the regulating piston 13 is interrupted. Hence, the circulation of the working oil of the working oil pressure passage 7 into the drain passage 11 is halted.

The working oil discharged from the fixed capacity pump 4 is supplied to the actuator 1 and accumulator 9 so as to perform the suitable steering assistance operation.

In the first embodiment, the fixed capacity pump 4 is used which is simple in construction so that the working oil quantity supplied to the actuator 1 can be varied and the inexpensive power assisted steering apparatus can be achieved.

In addition, since, during the non-operation of the actuator 1, the working oil discharged from the fixed capacity pump 4 is immediately circulated into the drain passage 11 from the part of the working oil pressure (hydraulic) passage 7 which is upstream to the check valve 8 without passing the actuator 1, the circulation of the working oil occurs. Thus, the temperature rise in the working oil can be suppressed. In addition, the durability of the power assisted steering apparatus can be increased.

When the steering assistance force is not needed, the quantity of the working oil discharged from the fixed capacity pump 4 is immediately circulated from the part of the working oil pressure passage 7 which is upstream to the check valve 8 through the regulator 10 without passing through the actuator 1 into the drain passage 11. Since no passage resistance is approximately received, the consumption of the driving force of the fixed capacity pump 4 is less. The power assisted steering apparatus whose power loss can advantageously be avoided can be achieved.

Furthermore, it is not necessary to attach such a clutch mechanism as stopping the drive of the pump during the non-operation of the actuator 1. In association with the pressure within the working oil pressure passage 7 in the actuator 1, the drain quantity controlled by means of the regulator 10 so as to continuously vary the working oil quantity supplied to the actuator 1. It is not necessary to use the open/closure valve to regulate the discharge quantity of the fixed capacity pump 4. Consequently, the whole power assisted steering apparatus can be simplified.

Second Embodiment

Figure 2:
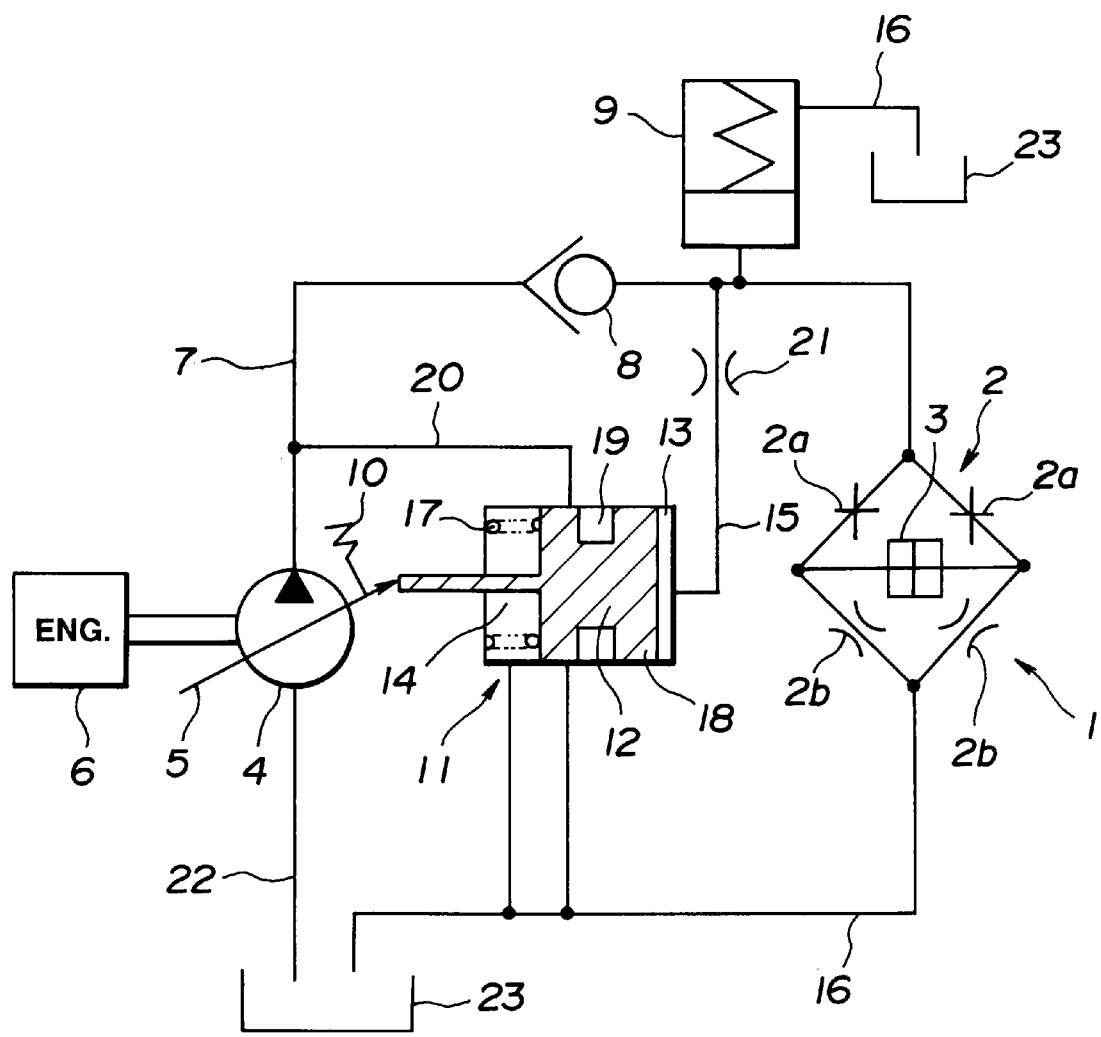
FIG. 2 is a schematic hydraulic circuit diagram of the power assisted steering apparatus in a second preferred embodiment according to the present invention.

FIG. 2 shows a second preferred embodiment of the power assisted steering apparatus according to the present invention.

In FIG. 2, the reference numeral 4 denotes a variable capacity pump (structure) whose structure is different from the fixed capacity pump 4 in the first embodiment.

The detailed structure of the variable capacity pump 4 is exemplified by a U.S. patent application Ser. No. 08/365,148 now abandoned, the disclosure of which is herein incorporated by reference.

It is noted that the variable capacity pump 4 is provided with a varying member 5 arranged for varying the discharge quantity and can always be driven and rotated according to the driving source, i.e., the engine 6.

It is noted that the regulating spring 10 is provided for biasing the varying member 5 in a direction such that the discharge quantity of the variable capacity pump 4 is increased.

The regulator 11 is a controlling mechanism arranged for biasing the varying member 5 in a direction such that the discharge quantity of the variable capacity pump 4 is decreased. The regulator 11 includes the regulating piston 12 linked to the varying member 5 and first and second regulating oil chambers 13 and 14 formed so as to oppose the side ends of the regulating piston 12.

The working oil within the part of the working oil pressure passage 7 which is downstream with respect to the check valve 8 is introduced into the first regulating oil chamber 13 of the regulator 11 and the second regulating oil chamber 14 is communicated to the drain passage 16. Thus, it is possible for the regulator 11 to exhibit the biasing force according to the pressure within the working oil introduced via the regulating oil pressure passage 15. It is noted that the drain regulating spring 17 is disposed within the second regulating oil chamber 14 so as to exhibit the spring force thereof in the same direction as the regulating spring 10, thus biasing the regulating piston 12 in the first regulating oil chamber 13.

The other structure in the second embodiment is the same as the structure in the first embodiment shown in FIG. 1.

The operation of the second embodiment is generally the same as that of the first embodiment.

However, the difference points will be described below.

The predetermined pressure held by means of the accumulator 9 is determined according to the regulating spring 10 biasing the varying member 5 of the variable capacity pump 4 and the spring force acted by means of the drain regulating spring 17.

The working oil within the part of the working oil pressure passage 7 which is downstream to the check valve 8 is introduced into the first regulating oil chamber 13 of the regulator 11 via the regulating oil pressure passage 15. The regulating piston 12 of the regulator 11 biases the varying member 5 in a direction such that the discharge quantity of the variable capacity pump 4 is decreased against the spring force of the regulating spring 10. The biasing force acted upon the regulator 11 is given in proportion to the pressure of the working oil within the part of the working oil pressure passage 7 which is downstream to the check valve 8. As the pressure in the working oil is increased, the discharge quantity of the variable capacity pump 4 is gradually reduced.

When the pressure of the working oil pressure passage 7 introduced into the first regulating oil chamber 13 of the regulator 11 reaches a predetermined maximum pressure, the regulating piston of the regulator 11 is moved toward the second regulating oil chamber 14 against the biasing force of the regulating spring 10 (and the drain regulating piston 17) so that the working oil discharged into the part of the working oil pressure passage 7 which is upstream to the check valve 8 is circulated into the drain passage 16.

That is to say, when the pressure within the first regulating oil chamber 13 of the regulator 11 reaches the maximum pressure, the regulating piston 12 is moved toward the second regulating oil chamber 14 against the spring force of the regulating spring 10 and the drain regulating spring 17 so that the communication between the branch passage 20 and the drain passage 16 via the groove 19 of the regulating piston 12 is achieved. In other words, in this state, the discharge quantity of the variable capacity pump 4 is controlled to a least quantity by means of the regulator 11. The discharged working oil immediately after the discharge is located upstream to the check valve 8 is circulated into the drain passage 16 via the groove 19 of the regulating piston 12 from the branch passage 20.

Hence, although it is slight, the working oil is circulated into the drain passage 16 from the intake hydraulic passage 22 so that the temperature rise in the working oil can advantageously be prevented. Since the variable capacity pump 4 is continuously driven and rotated by means of the internal combustion engine (driving source) 6, the slight quantity of the working oil is discharged so that the work as the pump is slight. Therefore, the consumption of the driving source of the variable capacity pump 4 is reduced so that the driving power loss can advantageously be avoided.

The least quantity of the working oil is discharged from the variable capacity pump 4. In a state wherein the working oil is circulated into the drain passage 16 via the regulator 11 from the branch passage 20, the working oil discharged from the variable capacity pump 4 is not supplied within the part of the working oil pressure passage 7 which is downstream with respect to the check valve 8. However, the part of the working oil pressure passage 7 which is downstream with respect to the check valve 8 and which is communicated with the downstream portion of the check valve 8 is interrupted by means of the check valve 8. At this part, the pressure application force by means of the accumulator 9 is given so that the pressure is held at the predetermined pressure. Hence, during the abrupt steering operation, the working oil positioned at the part of the working oil passage 7 which is upstream to the check valve 8 and accumulated by means of the accumulator 9 is speedily supplied to the accumulator 1 so that the smooth steering assistance operation can be achieved.

When the energy accumulated into the accumulator 9 according to the operation of the actuator 1 is consumed and the pressure within the part of the working oil pressure passage 7 which is downstream with respect to the check valve 8 is reduced, the pressure of the first regulating oil chamber 13 of the regulator 11 into which the working oil within the working oil pressure passage 7 is introduced so that the biasing force of the regulator 11 is gradually reduced according to the pressure described above. Hence, the spring force of the regulating spring 10 is larger so that the varying member 5 is biased in the direction such that the discharge quantity of the variable capacity pump 4 is increased according to the biasing force of the regulating spring 10, thus the discharge quantity of the variable capacity pump 4 being increased. At the same time, the regulator 11, the spring force of the regulating spring 10 is predominated so that the regulator 11 is biased according to the spring force of the regulating spring 10, thereby blocking the working oil discharged into the working oil pressure passage 7 from being caused to flow into the drain passage 16.

That is to say, when the pressure within the first regulating oil chamber 13 of the regulator 11 is decreased, the regulating piston 12 is moved toward the first regulating oil chamber 13 by means of the spring forces of the regulating spring 10 and the drain regulating spring 17. Consequently, the communication between the branch passage 20 and the drain passage 16 via the groove 19 of the regulating piston 12 is interrupted. Thus, the flow of the working oil from the working oil pressure passage 7 into the drain passage 16 is blocked. The working oil discharged from the variable capacity pump 4 is supplied to the actuator 1 and the accumulator 9 to suitably perform the steering assistance operation.

Consequently, during the non-operation of the actuator 1, the working oil is slightly discharged from the variable capacity pump 4. This discharged working oil is immediately circulated into the drain passage 16 via the regulating valve 11 from the part of the working oil pressure passage 7 which is upstream with respect to the check valve 8 so that the circulation of the working oil occurs.

The suppression of the temperature rise in the working oil can be achieved and the superior durability of the apparatus can be achieved.

It is not necessary for the clutch mechanism which halts the drive of the pump during the non-operation of the actuator 1. The varying member 5 of the variable capacity pump 4 is operated in connection with the pressure in the working oil pressure passage 7 of the actuator 1 and the discharge quantity of the working oil can continuously be varied. Hence, it is not necessary to use the open/closure valve to operate the modifying (varying) member 5 and the whole power assisted steering apparatus can be simplified.

Furthermore, the driving force consumed in the variable capacity pump 4 is concerned with the discharged quantity, the varying member 5 is operated so that the discharge quantity of the variable capacity pump 1 is limited to a slight quantity when the steering assistance force is not required. On the other hand, if the steering assistance force is required, the varying member 5 is controlled in connection with the steering assistance force so that the discharge quantity according to the steering assistance force to be exhibited by the actuator 1 can progressively be increased or decreased. The driving force of the variable capacity pump 4 can be consumed according to its necessity. Hence, the wasteful driving power consumption in the variable capacity pump 4 can be prevented and the driving power loss can advantageously be avoided.

Furthermore, since the varying member 5 is operated by means of the operating force associated with the steering force, the discharge characteristic of the variable capacity pump 1 can minutely be varied so that the smooth steering feeling can be achieved by the power assisted steering apparatus in the second embodiment.

The variable capacity pump 4 includes a rotor having a plurality of slide members arranged for being enabled to be projected in an approximately radial direction of the rotor and a cam ring eccentrically arranged with respect to the rotor and rotatably housing the rotor, the cam ring serving as the varying member 5.

The slide members are constituted by plungers or may be constituted by vanes.

What is claimed is:

1. A power assisted steering apparatus for a vehicle having a driving source and a steering mechanism, comprising:

an actuator that receives a supply or exhaust of a working oil to power assist a steering mechanism operation;

a pump adapted to be driven by the driving source;

a working oil pressure passage that supplies the working oil from said pump to said actuator;

a drain passage in fluid communication with said actuator to drain the working oil into a reservoir;

a check valve interposed in said working oil pressure passage to enable the working oil to flow in a first direction from said pump to said actuator but to prevent the working oil from flowing in a second direction, which is opposite to the first direction;

an accumulator in fluid communication with said working oil pressure passage downstream of said check valve to enable a pressure within the working oil pressure passage to be held under a predetermined pressure;

a regulator always in fluid communication with said working oil pressure passage via a branch passage upstream of said check valve and in fluid communication with said drain passage, said regulator regulating an inflow quantity of the working oil flowing through said working oil pressure passage by draining the working oil into said drain passage when the pressure within said working oil pressure passage reaches the predetermined pressure to bypass said check valve, said accumulator, and said actuator; and a regulated pressure passage providing fluid communication between said regulator and said working oil pressure passage downstream of said check valve, wherein said regulated pressure passage includes an orifice that attenuates pressure variations in said working oil pressure passage.

2. A power assisted steering apparatus for a vehicle having a driving source as claimed in claim 1, wherein said regulator comprises a regulating piston, a regulating spring disposed at one end of said regulating piston, and a regulating oil chamber formed on the other end of said regulating piston, wherein said regulating piston has a peripheral groove, and wherein said regulated passage is in fluid communication with said regulating oil chamber to control a movement of said regulating piston using the pressure in said working oil pressure passage, said regulator permitting fluid communication between said branch passage and said drain passage when said working oil pressure passage reaches the predetermined pressure, whereupon said regulating piston moves to a position that provides fluid communication between said branch passage and said drain passage via said peripheral groove.

3. A power assisted steering apparatus for a vehicle having a driving source as claimed in claim 1, wherein said pump is a variable capacity pump having a varying member arranged for varying a discharge quantity.

4. A power assisted steering apparatus for a vehicle having a driving source as claimed in claim 3, wherein said variable capacity pump has a regulated spring to bias said varying member in a direction that increases the discharge quantity.

5. A power assisted steering apparatus for a vehicle having a driving source as claimed in claim 3, wherein said regulator includes a regulating piston linked to said varying member and first and second regulated oil chambers at opposite ends of said regulating piston, said regulated pressure passage being in fluid communication with said first regulated oil chamber.

6. A power assisted steering apparatus for a vehicle having a driving source as claimed in claim 5, wherein said regulator further includes a regulating spring housed within said second regulated oil chamber to bias said regulating piston toward said first regulating oil chamber.

* * * * *